(12) United States Patent
Poremba et al.

(10) Patent No.: US 7,903,587 B2
(45) Date of Patent: Mar. 8, 2011

(54) WIRELESS EMERGENCY SERVICES PROTOCOLS TRANSLATOR BETWEEN ANSI-41 AND VOIP EMERGENCY SERVICES PROTOCOLS

(75) Inventors: Todd Poremba, Seattle, WA (US); Gordon J. Hines, Kirkland, WA (US); Victor Burton, Bellevue, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 141 days.

(21) Appl. No.: 12/453,870

(22) Filed: May 26, 2009

(65) Prior Publication Data
US 2010/0074148 A1 Mar. 25, 2010

Related U.S. Application Data

(60) Provisional application No. 61/129,008, filed on May 30, 2008.

(51) Int. Cl.
*H04L 12/16* (2006.01)
*H04J 3/16* (2006.01)
(52) U.S. Cl. .......................... 370/259; 370/467
(58) Field of Classification Search .................. 370/259, 370/328, 389, 392, 401, 467
See application file for complete search history.

(56) References Cited

U.S. PATENT DOCUMENTS

| | | | |
|---|---|---|---|
| 5,712,900 A | 1/1998 | Maupin | |
| 5,937,344 A | 8/1999 | Zicker | |
| 6,002,936 A | 12/1999 | Roel-Ng | |
| 6,108,533 A | 8/2000 | Brohoff | |
| 6,275,937 B1 | 8/2001 | Hailpern | |
| 6,321,092 B1 | 11/2001 | Fitch | |
| 6,330,313 B1 | 12/2001 | Hunt | |
| 6,427,001 B1 | 7/2002 | Contractor | |
| 6,526,026 B1 * | 2/2003 | Menon | 370/310 |
| 6,529,500 B1 | 3/2003 | Pandharipande | |
| 6,587,691 B1 | 7/2003 | Granstam | |
| 6,687,504 B1 | 2/2004 | Raith | |
| 6,731,940 B1 | 5/2004 | Nagendran | |
| 6,744,858 B1 | 6/2004 | Ryan | |

(Continued)

FOREIGN PATENT DOCUMENTS

WO  WO01/45342  6/2001

(Continued)

OTHER PUBLICATIONS

Yilin Ahao, Efficient and reliable date transmission for cellular and GPS based mayday systems, Nov. 1997, IEEE, IEEE Conference on Intelligent Transportation System, 1997, ITSC 97, 555-559.

(Continued)

Primary Examiner — Hong Cho
(74) Attorney, Agent, or Firm — William H. Bollman

(57) ABSTRACT

A protocol converter or translator between ANSI-41 ORREQs and VoIP V2 messaging. The protocol converter may alternatively (or also) provide conversion between GSM MAP and VoIP V2 messaging. Interaction of VSPs with a Mobile Positioning Center (MPC) or a Gateway Mobile Location Center (GMLC) is permitted, as is interaction of wireless carriers with a VoIP Positioning Center (VPC). In this way existing GMLCs or MPCs may be used to service VoIP 9-1-1 calls. Moreover, operators of VoIP Positioning Centers (VPCs) who implement wireless offerings can re-use their existing VPCs to service wireless 9-1-1 calls.

21 Claims, 4 Drawing Sheets

U.S. PATENT DOCUMENTS

| | | | |
|---|---|---|---|
| 6,757,545 B2 | 6/2004 | Nowak | |
| 6,775,267 B1 | 8/2004 | Kung | |
| 6,775,534 B2 | 8/2004 | Lindgren | |
| 6,795,444 B1* | 9/2004 | Vo et al. | 370/401 |
| 6,813,501 B2 | 11/2004 | Kinnunen | |
| 6,847,618 B2 | 1/2005 | Laursen | |
| 6,876,734 B1 | 4/2005 | Summers | |
| 6,898,274 B1 | 5/2005 | Galt | |
| 6,940,826 B1 | 9/2005 | Simard | |
| 6,963,748 B2 | 11/2005 | Chithambaram | |
| 6,968,044 B2 | 11/2005 | Beason | |
| 6,985,747 B2 | 1/2006 | Chithambaram | |
| 7,031,724 B2 | 4/2006 | Ross | |
| 7,106,717 B2 | 9/2006 | Rousseau | |
| 7,136,466 B1 | 11/2006 | Gao | |
| 7,174,153 B2 | 2/2007 | Ehlers | |
| 7,177,397 B2 | 2/2007 | McCalmont | |
| 7,177,398 B2 | 2/2007 | Meer | |
| 7,177,399 B2 | 2/2007 | Dawson | |
| 7,200,380 B2 | 4/2007 | Havlark | |
| 7,245,900 B1 | 7/2007 | Lamb | |
| 7,245,910 B2 | 7/2007 | Osmo | |
| 7,260,186 B2 | 8/2007 | Zhu | |
| 7,321,773 B2 | 1/2008 | Hines | |
| 7,330,899 B2 | 2/2008 | Wong | |
| 7,369,530 B2 | 5/2008 | Keagy | |
| 7,382,773 B2 | 6/2008 | Schoeneberger | |
| 7,394,896 B2 | 7/2008 | Norton | |
| 7,428,571 B2 | 9/2008 | Ichimura | |
| 7,436,785 B1 | 10/2008 | McMullen | |
| 7,440,442 B2 | 10/2008 | Grabelsky | |
| 7,477,903 B2 | 1/2009 | Wilcock | |
| 7,573,982 B2 | 8/2009 | Breen | |
| 7,602,886 B1 | 10/2009 | Beech | |
| 7,627,331 B2 | 12/2009 | Winterbottom | |
| 2001/0040886 A1 | 11/2001 | Jimenez et al. | |
| 2002/0055924 A1 | 5/2002 | Liming | |
| 2002/0077083 A1 | 6/2002 | Zellner | |
| 2002/0077084 A1 | 6/2002 | Zellner | |
| 2002/0077118 A1 | 6/2002 | Zellner | |
| 2002/0077897 A1 | 6/2002 | Zellner | |
| 2002/0086676 A1 | 7/2002 | Hendry | |
| 2002/0099802 A1 | 7/2002 | Marsh | |
| 2002/0118650 A1 | 8/2002 | Jagadeesan | |
| 2002/0123354 A1 | 9/2002 | Nowak | |
| 2002/0126656 A1 | 9/2002 | Park | |
| 2002/0154221 A1 | 10/2002 | Ishimaru | |
| 2002/0158777 A1 | 10/2002 | Flick | |
| 2003/0009277 A1 | 1/2003 | Fan | |
| 2003/0012148 A1 | 1/2003 | Peters | |
| 2003/0026245 A1 | 2/2003 | Ejzak | |
| 2003/0081752 A1 | 5/2003 | Trandal | |
| 2003/0108176 A1 | 6/2003 | Kung | |
| 2003/0109245 A1 | 6/2003 | McCalmont | |
| 2003/0115261 A1 | 6/2003 | Mohammed | |
| 2003/0119521 A1 | 6/2003 | Tipnis | |
| 2003/0119528 A1 | 6/2003 | Pew | |
| 2003/0125021 A1 | 7/2003 | Tell et al. | |
| 2003/0135493 A1 | 7/2003 | Phelan et al. | |
| 2003/0201931 A1 | 10/2003 | Durst | |
| 2003/0222901 A1 | 12/2003 | Houck | |
| 2004/0041729 A1 | 3/2004 | Rowitch | |
| 2004/0043775 A1 | 3/2004 | Kennedy | |
| 2004/0064500 A1 | 4/2004 | Kolar | |
| 2004/0107143 A1 | 6/2004 | Niemi | |
| 2004/0132465 A1 | 7/2004 | Mattila | |
| 2004/0157175 A1 | 8/2004 | Matsumoto | |
| 2004/0176123 A1 | 9/2004 | Chin | |
| 2004/0181689 A1 | 9/2004 | Kiyoto | |
| 2004/0190497 A1 | 9/2004 | Knox | |
| 2004/0198386 A1 | 10/2004 | Dupray | |
| 2004/0203575 A1 | 10/2004 | Chin | |
| 2004/0203919 A1 | 10/2004 | Ross | |
| 2004/0204847 A1 | 10/2004 | Yanai | |
| 2005/0003797 A1 | 1/2005 | Baldwin | |
| 2005/0039135 A1 | 2/2005 | Othmer | |
| 2005/0053209 A1 | 3/2005 | D'Evelyn | |
| 2005/0083911 A1 | 4/2005 | Grabelsky | |
| 2005/0107673 A1 | 5/2005 | Ball | |
| 2005/0135569 A1 | 6/2005 | Dickinson | |
| 2005/0136885 A1 | 6/2005 | Kaltsukis | |
| 2005/0148351 A1 | 7/2005 | Reding | |
| 2005/0148353 A1 | 7/2005 | Hicks | |
| 2005/0169248 A1 | 8/2005 | Truesdale | |
| 2005/0174991 A1 | 8/2005 | Keagy | |
| 2005/0181805 A1 | 8/2005 | Gallagher | |
| 2005/0186948 A1 | 8/2005 | Gallagher | |
| 2005/0188078 A1 | 8/2005 | Kotzin | |
| 2005/0195954 A1 | 9/2005 | Klein et al. | |
| 2005/0201529 A1 | 9/2005 | Nelson | |
| 2005/0213537 A1 | 9/2005 | Ingimundarson | |
| 2005/0265318 A1 | 12/2005 | Khartabil | |
| 2005/0271051 A1 | 12/2005 | Holloway | |
| 2005/0272424 A1 | 12/2005 | Gallagher | |
| 2005/0272449 A1 | 12/2005 | Gallagher | |
| 2005/0282518 A1 | 12/2005 | D'Evlyn | |
| 2005/0287979 A1 | 12/2005 | Rollender | |
| 2005/0289097 A1 | 12/2005 | Trossen | |
| 2006/0026288 A1 | 2/2006 | Acharya | |
| 2006/0058049 A1 | 3/2006 | McLaughlin | |
| 2006/0068753 A1 | 3/2006 | Karpen | |
| 2006/0073812 A1 | 4/2006 | Punaganti | |
| 2006/0079236 A1 | 4/2006 | Del Pino | |
| 2006/0120517 A1 | 6/2006 | Moon | |
| 2006/0135132 A1 | 6/2006 | Cai | |
| 2006/0135177 A1 | 6/2006 | Winterbottom | |
| 2006/0154665 A1 | 7/2006 | Svensson | |
| 2006/0184617 A1 | 8/2006 | Nicholas | |
| 2006/0188083 A1 | 8/2006 | Breen | |
| 2006/0189303 A1 | 8/2006 | Rollender | |
| 2006/0205383 A1 | 9/2006 | Rollender | |
| 2006/0236258 A1 | 10/2006 | Othmer | |
| 2006/0239205 A1 | 10/2006 | Warren | |
| 2006/0293024 A1 | 12/2006 | Benco | |
| 2006/0293066 A1 | 12/2006 | Edge | |
| 2007/0008885 A1 | 1/2007 | Bonner | |
| 2007/0022011 A1 | 1/2007 | Altberg | |
| 2007/0027997 A1 | 2/2007 | Polk | |
| 2007/0036139 A1 | 2/2007 | Patel | |
| 2007/0041513 A1 | 2/2007 | Gende | |
| 2007/0081635 A1 | 4/2007 | Croak | |
| 2007/0121601 A1 | 5/2007 | Kikinis | |
| 2007/0160036 A1 | 7/2007 | Smith | |
| 2007/0162228 A1 | 7/2007 | Mitchell | |
| 2007/0202844 A1 | 8/2007 | Wilson | |
| 2007/0206568 A1* | 9/2007 | Silver et al. | 370/352 |
| 2007/0206613 A1* | 9/2007 | Silver et al. | 370/401 |
| 2007/0238448 A1 | 10/2007 | Gallagher | |
| 2007/0242660 A1 | 10/2007 | Xu | |
| 2007/0263610 A1 | 11/2007 | Mitchell | |
| 2007/0293205 A1 | 12/2007 | Henderson | |
| 2008/0037715 A1 | 2/2008 | Prozeniuk | |
| 2008/0063153 A1 | 3/2008 | Krivorot | |
| 2008/0065775 A1 | 3/2008 | Polk | |
| 2008/0081646 A1 | 4/2008 | Morin et al. | |
| 2008/0117859 A1* | 5/2008 | Shahidi et al. | 370/328 |
| 2008/0186164 A1 | 8/2008 | Emigh | |
| 2010/0003954 A1 | 1/2010 | Greene | |

FOREIGN PATENT DOCUMENTS

| | | |
|---|---|---|
| WO | WO2004/025941 | 3/2004 |

OTHER PUBLICATIONS

International Search Report in PCT/US/2010/01938 dated Sep. 30, 2010.

Extended European Search Report from EPO in European Appl. No. 06827172.5 dated Dec. 29, 2009.

International Search Report issued in PCT/US2009/002752, dated Jul. 6, 2009.

* cited by examiner

WIRELESS EMERGENCY SERVICES PROTOCOLS TRANSLATOR BETWEEN ANSI-41 AND VOIP EMERGENCY SERVICES PROTOCOLS This application claims priority from U.S. Provisional Application No. 61/129,008 entitled "WIRELESS EMERGENCY SERVICES PROTOCOLS TRANSLATED BACK AND FORTH TO VoIP EMERGENCY SERVICES PROTOCOLS", to Poremba et al., filed May 30, 2008, the entirety of which is explicitly incorporated herein by reference.

BACKGROUND OF THE INVENTION

1. Field of the Invention

This invention relates generally to wireless telecommunications. More particularly, it relates to wireless telecommunication protocol conversion to Voice Over Internet Protocol (VoIP) protocol and vice versa. Specifically, ANSI-41 J-STD-036 E3 interface to VoIP NENA 08-001 V2 interface and vice versa. As well as, GSM J-STD-036 Lg/Lg+ interface to VoIP NENA 08-001 V2 interface and vice versa.

2. Background of the Related Art

Voice Over Internet Protocol (VoIP) is a technology that has been developed as an alternative packet-based telephony technology to the conventional service over the Public Switch Telephone Network (PSTN). VoIP takes advantage of high speed Internet data networks, and is able to provide low cost telephony services to end users. VoIP technology emulates a phone call, but instead of using a circuit based switched system such as the telephone network, utilizes packetized data transmission techniques most notably implemented in the Internet.

VoIP phone calls are routed to a VoIP voice gateway, from which they are passed on to their destination VoIP device. Conventional VoIP voice gateways (i.e., soft switches) are typically located in only a few places across the country. A soft switch is a programmable network switch that can process the signaling for all types of packet protocols. Also known as a 'media gateway controller,' 'call agent,' or 'call server,' such devices are used by carriers that support converged communications services by integrating signaling system No. 7 (SS7) type switched telephone signaling with packet networks. Softswitches can support, e.g., IP, DSL, ATM and frame relay.

Because VoIP is Internet Protocol (IP) based, call related information such as CallerID type services may not be available or accurate. A location of a given VoIP device may be statically provisioned to be at a given geographic location, or queried from a home location register (HLR) in a mobile system.

911 is a phone number widely recognized as an emergency phone number that is routed to emergency dispatch personnel and used to determine a location of a caller. Enhanced 911 (E911) is defined by the transmission of callback number and location information to the relevant public safety answering point (PSAP). A PSAP is the endpoint of an emergency services call. PSAPs are responsible for answering emergency services calls. E911 may be implemented for landline and/or mobile devices. Some Public Safety Answering Points (PSAPs) are not enhanced, and thus do not receive the callback or location information from any phone, landline or mobile.

The problem is not necessarily solved with the use of a centralized emergency call center. In such case, when a VoIP customer places an emergency call such as an E911 call, the call may be routed to an emergency call center that is very far away, and in some instances half-way across the world to reach the centralized emergency call center. The VoIP E911 call must then be transferred to the relevant 911 center (public safety answering point (PSAP)). However, this transfer must take place over the Public Switched Telephone Network (PSTN) because such transfer cannot conventionally be gained to the PSAP's existing Enhanced 911 (E911) dedicated network where location and callback number of the originating 911 caller are provided. Moreover, note that even the call related information (e.g., CallerID) provided with the call would relate to the identity and location of the centralized call center—not to the callback number and certainly not the location of the customer originally dialing 911.

An ANSI-41 J-STD-036 E3 ("E3") interface is a subset of ANSI-41 SS7 Transaction Capabilities Application Part (TCAP) used for emergency calls when the Mobile Positioning Center (MPC) is separate from the Mobile Switching Center (MSC) that routes non-emergency calls. A voice over Internet Protocol (VoIP) NENA 08-001 V2 ("V2") interface is used to request emergency call routing information when the call server/routing proxy/redirect server is a separate element from a VoIP voice over Internet Protocol (VoIP) positioning center (VPC).

Session Internet Protocol (SIP) to ISDN User Part (ISUP) conversion, and ISUP to SIP conversion is somewhat common in the market. But currently, an E3 interface interfaces only with a mobile positioning center (MPC). Similarly, an Lg/Lg+ interface interfaces only with Gateway Mobile Location Centers (GMLCs), and V2 interfaces only with VoIP Positioning Centers (VPCs).

SUMMARY OF THE INVENTION

In accordance with the principles of the present invention, a method and apparatus to translate emergency services protocol call setup information from VoIP V2 to ANSI-41 ORREQ comprises receiving VoIP V2 signaling from a Voice Service Provider (VSP). A call back number (CBN) is inserted into both a mobile directory number (MDN) field and an emergency service routing digits (ESRD) field of an ANSI-41 ORREQ. An emergency service routing key (ESRK) and, if needed, digits are inserted to determine a selective router and/or trunk, into up to 20 digits of a VoIP V2 message. Use of the digits received in the VoIP V2 message permit setup of an emergency services call over Session Initiation Protocol (SIP) using a wireless ESRK.

Apparatus and a method to translate emergency services protocol call setup information from VoIP V2 to GSM MAP SLR in accordance with another aspect of the invention comprises receiving VoIP V2 signaling from a Voice Service Provider (VSP). A call back number (CBN) is inserted into both an International Mobile Subscriber Identity (IMSI) field and an na-ESRD field of a GSM MAP SLR. An emergency service routing key (ESRK) is inserted and, if needed, digits are inserted to determine a selective router and/or trunk, into up to 20 digits of a VoIP V2 message. Use of the digits received in the VoIP V2 message permit setup of an emergency services call over Session Initiation Protocol (SIP) using a wireless ESRK.

Apparatus and a method to translate emergency services protocol call setup information from ANSI-41 ORREQ to VoIP V2 in accordance with yet another aspect of the invention comprises receiving an ANSI-41 ORREQ containing a call back number (CBN) and emergency service routing digits (ESRD) from a mobile switching center (MSC). The CBN is converted to a VoIP V2 request. The VoIP V2 request is sent to a VoIP positioning center (VPC). The VoIP V2 request including an emergency service query key (ESQK) and an emergency service routing number (ESRN) inserted therein in a plurality of designated fields, is returned by a VoIP positioning center (VPC). Use of the ORREQ permits setup of an emergency services call over ISDN User Part (ISUP) or Multi-Frequency (MF) signaling.

Apparatus and a method to translate emergency services protocol call setup information from GSM MAP SLR to VoIP V2 in accordance with still another aspect of the invention comprises receiving a GSM MAP SLR containing a call back number (CBN) and emergency service routing digits (ESRD) from a mobile switching (MSC). The CBN and ESRD are converted to a VoIP V2 request. The VoIP V2 request is sent to a VoIP positioning center (VPC). The VoIP V2 request including an emergency service query key (ESQK) and an emergency service routing number (ESRN) is returned by a VoIP positioning center (VPC). The VoIP V2 request is converted to an SLR with an na-ESRK with the ESQK and a last 7-digits of the ESRN. Use of the SLR permits setup of an emergency services call over ISDN User Part (ISUP) or Multi-Frequency (MF) signaling.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

The present inventors have appreciated that wireless carriers may soon desire the ability to use current, ANSI-41-based wireless telecommunications protocols to request Voice Over Internet Protocol (VoIP) call routing information. They also have appreciated that VoIP Service Providers may soon desire the ability to use current VoIP protocols to request IS41-based wireless call routing information. But ANSI-41 and Voice Over Internet Protocol (VoIP) are disparate protocols, and thus Signaling System No. 7 (SS7) nodes (ANSI-41-based) cannot signal to VoIP Positioning Centers (VPCs). Similarly, VoIP nodes cannot signal to Mobile Positioning Centers (MPCs) or Gateway Mobile Location Centers (GMLCs).

The present invention provides a protocol converter (or alternatively referred to as a translator) between ANSI-41 ORREQs and VoIP V2 messaging. The invention also provides protocol conversion (or alternatively translation) between GMS MAP and VoIP V2 messaging.

Figure 1:
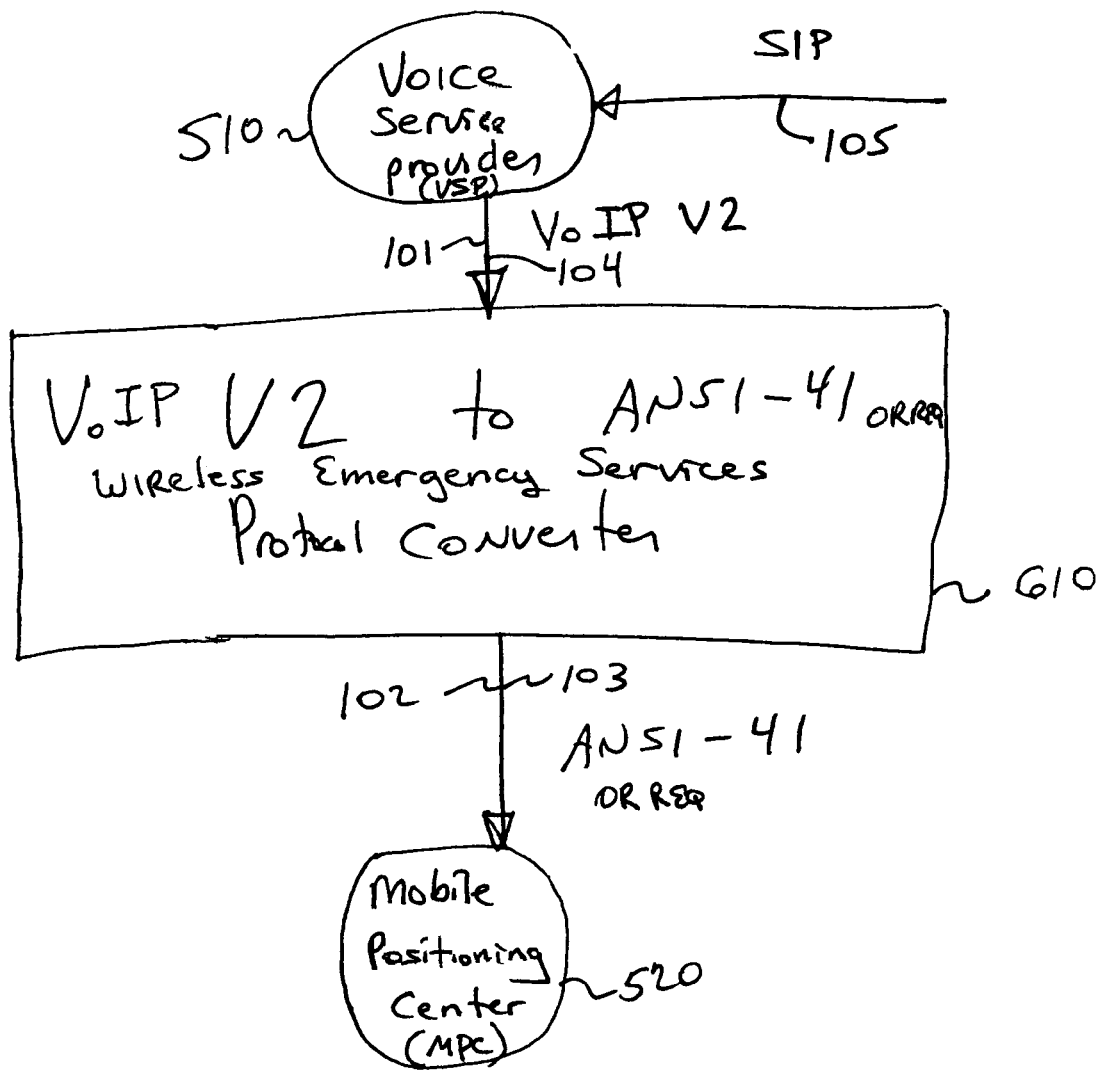
FIG. 1 shows conversion of Voice Over Internet Protocool (VoIP) emergency call set up to wireless emergency call set up, with VoIP V2 converted to ANSI-41 ORREQs, in accordance with the principles of the present invention.

FIG. 1 shows conversion of Voice Over Internet Protocool (VoIP) emergency call set up to wireless emergency call set up, with VoIP V2 converted to ANSI-41 ORREQs, in accordance with the principles of the present invention.

In particular, as shown in FIG. 1, emergency services protocols are translated from those of a voice service provider (VSP) 510 to those of a mobile positioning center (MPC) 520, by a VoIP V2 to ANSI-41 ORREQ Wireless Emergency Services Protocol Converter 610.

The VoIP V2 to ANSI-41 ORREQ Wireless Emergency Services Protocol Converter 610 functions as follows:

In step 101 of FIG. 1, the voice service provider (VSD) 510 signals VoIP V2 to the VoIP V2 to ANSI-41 ORREQ Wireless Emergency Services Protocol Converter 610.

In step 102, the VoIP V2 to ANSI-41 ORREQ Wireless Emergency Services Protocol Converter 610 puts the call back number (CBN) into an ANSI-41 ORREQ, with the call back number (CBN) preferably in both the mobile directory number (MDN) field and the emergency services routing digits (ESRD) field of the ORREQ.

In step 103, the mobile positioning center (MPC) 520 treats the mobile directory number (MDN) as the emergency services routing digits (ESRD), and the ESRD determines an ESRK (and possibly digits to select the selective router or the trunk group) based on the subscribers provisioned address, similar to how wireless calls route based on the location of a cell tower.

In step 104, the VoIP V2 to ANSI-41 ORREQ Wireless Emergency Services Protocol Converter 610 puts the ESRK and, if needed, the digits to determine the selective router and/or trunk, into a VoIP V2 message containing up to 20 digits in a preferred embodiment.

In step 105, the voice service provider (VSP) 510 uses the digits received in the VoIP V2 message to set up the call over Session Initiation Protocol (SIP) using a wireless emergency services routing key (ESRK).

Figure 2:
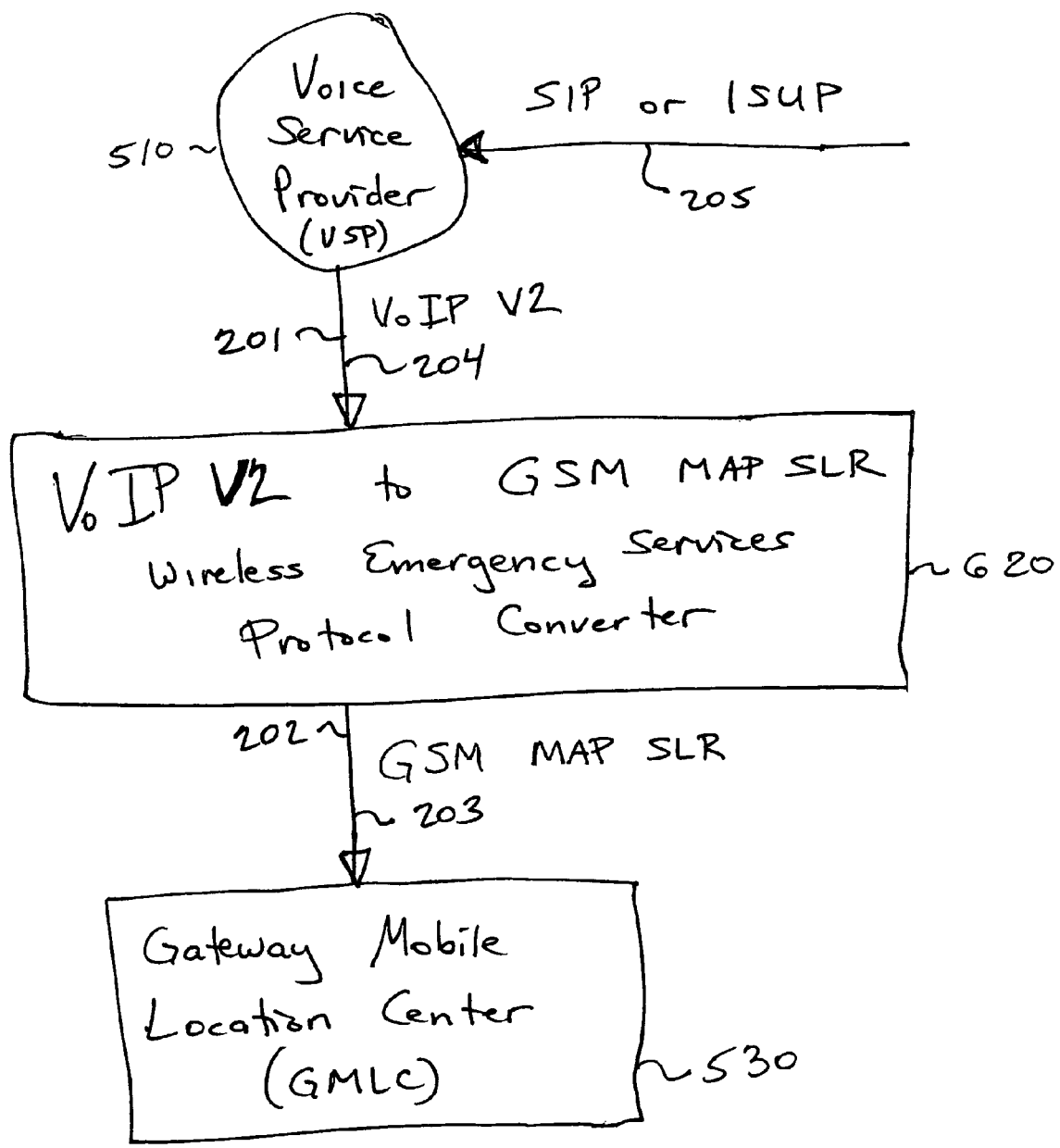
FIG. 2 shows conversion of Voice Over Internet Protocol (VoIP) emergency call set up to wireless emergency call set up, with VoIP V2 converted to GSM MAP SLRs, in accordance with the principles of the present invention.

FIG. 2 shows conversion of Voice Over Internet Protocol (VoIP) emergency call set up to wireless emergency call set up, with VoIP V2 converted to GSM MAP SLRs, in accordance with the principles of the present invention.

In particular, as shown in FIG. 2, emergency services protocols are translated from those of a voice service provider (VSP) 510 to those of a Gateway Mobile Location Center (GMLC) 530, by a VoIP V2 to GSM MAP SLR Wireless Emergency Services Protocol Converter 620.

The VoIP V2 to GSM MAP SLR Wireless Emergency Services Protocol Converter 620 functions as follows:

In step 201 shown in FIG. 2, the Voice Service Provider (VSP) 510 signals VoIP V2 to the VoIP V2 to GSM MAP SLR Wireless Emergency Services Protocol Converter 620.

In step 202, the VoIP V2 to GSM MAP SLR Wireless Emergency Services Protocol Converter 620 puts the call back number (CBN) into a GSM MAP SLR with the call back number (CBN) preferably inserted into both the International Mobile Subscriber Identity (IMSI) field and the na-ESRD field, and it sets the na-ESRK flag.

In step 203, the Gateway Mobile Location Center (GMLC) 530 treats the call back number (CBN) as ESRD, and the ESRD determines an ESRK (and possibly digits to select the selective router or the trunk group) based on the subscribers provisioned address, similar to how wireless calls route based on the location of a cell tower. The return SLR contains 17 digits: the 10 digit ESRK and up to 7 digits to determine the trunk group.

In accordance with the embodiment, it is also possible that the second 7 digits be used to represent a 10 digit number with the same NPA as the ESRK. It is preferable that the SLR na-ESRK may only contain 18 digits.

In step 204, the VoIP V2 to GSM MAP SLR Wireless Emergency Services Protocol Converter 620 puts the ESRK and, if needed, the digits to determine the selective router and/or trunk, into a VoIP V2 message containing up to 20 digits.

In step 205, the Voice Service Provider (VSP) 510 uses the digits received over VoIP V2 to set up the call over Session Initiation Protocol (SIP) using a wireless ESRK.

Figure 3:
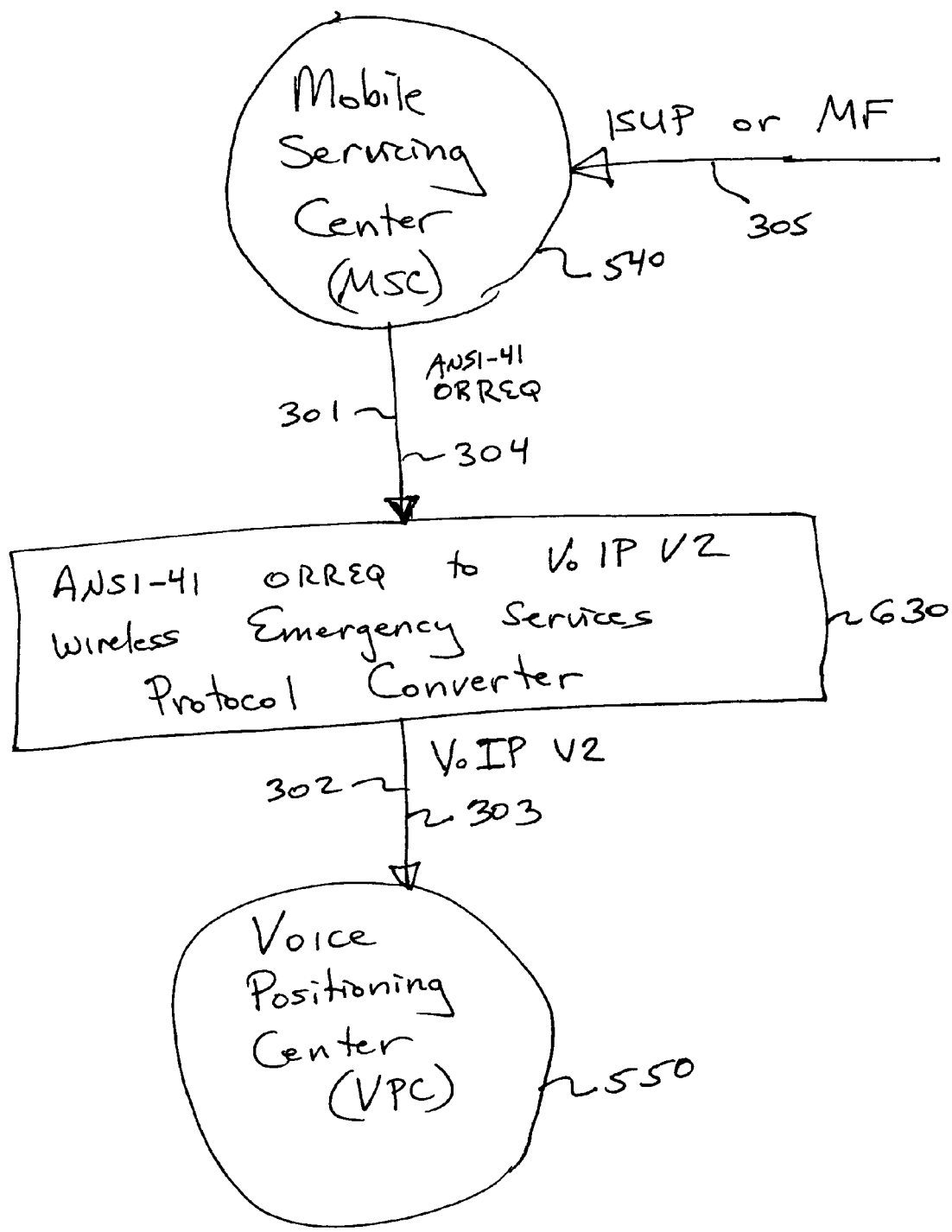
FIG. 3 shows conversion of wireless emergency call set up to Voice Over Internet Protocol (VoIP) emergency call set up, with ANSI-41 ORREQs being converted to VoIP V2, in accordance with the principles of the present invention.

FIG. 3 shows conversion of wireless emergency call set up to Voice Over Internet Protocol (VoIP) emergency call set up, with ANSI-41 ORREQs being converted to VoIP V2, in accordance with the principles of the present invention.

In particular, as shown in FIG. 3, emergency services protocols are translated back from those of a mobile switching center (MSC) 540 to those of a VoIP Positioning Center (VPC) 550, by an ANSI-41 ORREQ to VoIP V2 Wireless Emergency Services Protocol Converter 630.

The ANSI-41 ORREQ to VoIP V2 Wireless Emergency Services Protocol Converter 630 functions as follows:

In step 301 of FIG. 3, for ANSI-41 signaling, the ORREQ sent by the Mobile Switching (MSC) 540 preferably contains the call back number (CBN) and the Emergency Services Routing Digits (ESRD).

In step 302, the ANSI-41 ORREQ to VoIP V2 Wireless Emergency Services Protocol Converter 630 receives the ORREQ request with the call back number (CBN) and Emergency Services Routing Digits (ESRD), converts it to a VoIP V2 request, and sends the VoIP V2 request to the VoIP Positioning Center (VPC) 550.

In step 303, the VoIP Positioning Center (VPC) 550 is configured to return an Emergency Service Query Key (ESQK) and Emergency Service Routing Number (ESRN).

In step 304, the ANSI-41 ORREQ to VoIP V2 Wireless Emergency Services Protocol Converter 630 receives the VoIP V2 request and converts it to an ORREQ with the Emergency Service Routing Number (ESRN) and Emergency Service Query Key (ESQK) into designated fields. Exemplary designated fields used for insertion of the combination of the ESRN and ESQK may be any combination of the DialedDigits field, the Mobile Directory Number (MDN) field, the BillingDigits field, and/or the GenericDigits field.

In step 305, the Mobile Switching Center (MSC) 540 receives the ORREQ and sets up the call appropriately over ISDN User Part (ISUP) or Multi-Frequency (MF) signaling.

Figure 4:
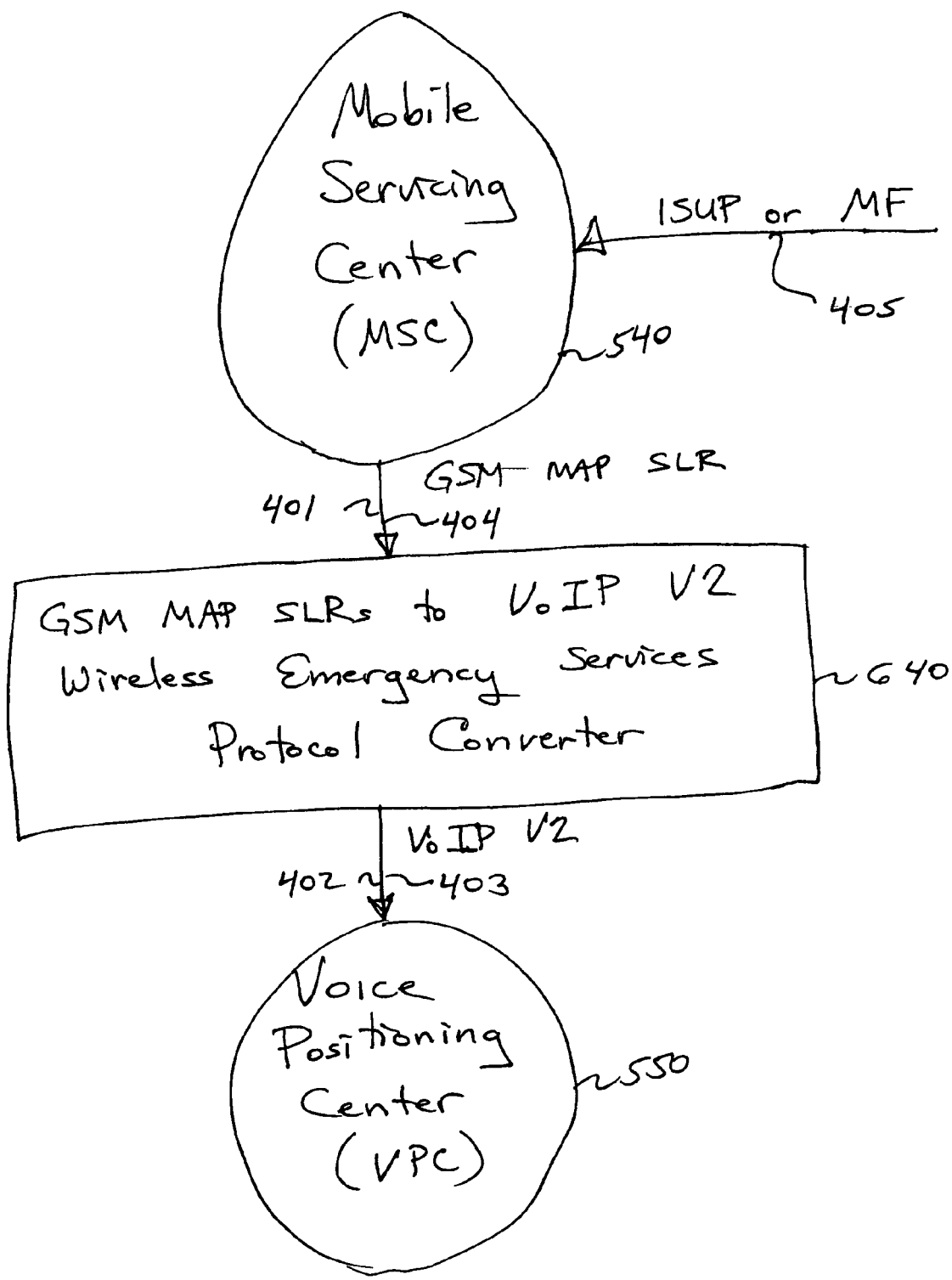
FIG. 4 shows conversion of wireless emergency call set up to Voice Over Internet Protocol (VoIP) emergency call set up, with GSM MAP SLRs converted to VoIP V2s, in accordance with the principles of the present invention.

FIG. 4 shows conversion of wireless emergency call set up to Voice Over Internet Protocol (VoIP) emergency call set up, with GSM MAP SLRs converted to VoIP V2s, in accordance with the principles of the present invention.

In particular, as shown in FIG. 4, emergency services protocols are translated back from those of a mobile switching (MSC) 540 to those of a VoIP Positioning Center (VPC) 550, by a GSM MAP SLRs to VoIP V2 Wireless Emergency Services Protocol Converter 640.

The GSM MAP SLRs to VoIP V2 Wireless Emergency Services Protocol Converter 640 functions as follows:

In step 401 of FIG. 4, for GSM MAP signaling, the GSM MAP SLR sent by the Mobile Switching (MSC) 540 preferably contains the call back number (CBN) and the Emergency Services Routing Digits (ESRD).

In step 402, the GSM MAP SLRs to VoIP V2 Wireless Emergency Services Protocol Converter 640 receives an SLR request with the call back number (CBN) and Emergency Services Routing Digits (ESRD), converts it to a VoIP V2 request, and sends the VoIP V2 request to the VoIP Positioning Center (VPC) 550.

In step 403, the VoIP Positioning Center (VPC) 550 is configured to return an Emergency Service Query Key (ESQK) and Emergency Service Routing Number (ESRN).

In step 404, the GSM MAP SLRs to VoIP V2 Wireless Emergency Services Protocol Converter 640 receives a VoIP V2 request and converts it to an SLR with the na-ESRK with the Emergency Service Query Key (ESQK) and the last 7-digits of the Emergency Service Routing Number (ESRN).

Note that the na-ERSK field contains a maximum of 18 digits. In the preferred embodiment, the numbering plan area (NPA) of the Emergency Service Routing Number (ESRN) is preferably always the same as the numbering plan area (NPA) of the Emergency Service Query Key (ESQK).

In step 405, the Mobile Switching Center (MSC) 540 receives the SLR and sets up the call appropriately over ISUP or Multi-Frequency (MF) signaling.

Benefits of the invention include that operators of Gateway Mobile Location Centers (GMLCs) or Mobile Positioning Centers (MPCs) who implement VoIP offerings can re-use their existing GMLC or MPC to service VoIP 9-1-1 calls. Moreover, operators of VoIP Positioning Centers (VPCs) who implement wireless offerings can re-use their existing VPCs to service wireless 9-1-1 calls.

The invention allows interaction of VSPs with a Mobile Positioning Center (MPC) or Gateway Mobile Location Center (GMLC), and/or interaction of wireless carriers with a VoIP Positioning Center (VPC). Those that will find particular use of the invention include wireless carriers, VoIP service providers, and especially those who already own an MPC, GMLC, or VPC and want to provide both wireless and VoIP telecommunications.

While the invention has been described with reference to the exemplary embodiments thereof, those skilled in the art will be able to make various modifications to the described embodiments of the invention without departing from the true spirit and scope of the invention.

What is claimed is:

1. Apparatus to translate emergency services protocol call setup information from VoIP V2 to ANSI-41 ORREQ, comprising:
   a receiver to receive VoIP V2 signaling from a Voice Service Provider (VSP);
   a CBN inserter to insert a call back number (CBN) into both a mobile directory number (MDN) field and an emergency service routing digits (ESRD) field of an ANSI-41 ORREQ; and
   an ESRK inserter to insert an emergency service routing key (ESRK) and, if needed, to insert digits to determine a selective router and/or trunk, into up to 20 digits of a VoIP V2 message;
   whereby use of said digits received in said VoIP V2 message permit setup of an emergency services call over Session Initiation Protocol (SIP) using a wireless ESRK.

2. The apparatus to translate emergency services protocol call setup information from VoIP V2 to ANSI-41 ORREQ according to claim 1, wherein:
   said received mobile directory number (MDN) may be treated as emergency services routing digits (ESRD), permitting said ESRD to determine an ESRK based on a subscribers provisioned address.

3. The apparatus to translate emergency services protocol call setup information from VoIP V2 to ANSI-41 ORREQ according to claim 2, wherein:
   said received mobile directory number (MDN) may be treated as emergency services routing digits (ESRD), also permits said ESRD to determine digits to select a proper selective router or a proper trunk group based on said subscribers provisioned address.

4. Apparatus to translate emergency services protocol call setup information from VoIP V2 to GSM MAP SLR, comprising:
   a receiver to receive VoIP V2 signaling from a Voice Service Provider (VSP);
   a CBN inserter to insert a call back number (CBN) into both an International Mobile Subscriber Identity (IMSI) field and an na-ESRD field of a GSM MAP SLR; and
   an ESRK inserter to insert an emergency service routing key (ESRK) and, if needed, digits to determine a selective router and/or trunk, into up to 20 digits of a VoIP V2 message;
   whereby use of said digits received in said VoIP V2 message permit setup of an emergency services call over Session Initiation Protocol (SIP) using a wireless ESRK.

5. The apparatus to translate emergency services protocol call setup information from VoIP V2 to GSM MAP SLR according to claim 4, wherein:
   said received call back number (CBN) may be treated as emergency services routing digits (ESRD), permitting said ESRD to determine an ESRK based on a subscribers provisioned address.

6. The apparatus to translate emergency services protocol call setup information from VoIP V2 to GSM MAP SLR according to claim 5, wherein:
   said received mobile directory number (MDN) may be treated as emergency services routing digits (ESRD), also permits said ESRD to determine digits to select a proper selective router or a proper trunk group based on said subscribers provisioned address.

7. The apparatus to translate emergency services protocol call setup information from VoIP V2 to GSM MAP SLR according to claim 4, wherein:
   said insertion of said CBN sets an na-ESRK flag.

8. Apparatus to translate emergency services protocol call setup information from ANSI-41 ORREQ to VoIP V2, comprising:
   a receiver to receive an ANSI-41 ORREQ containing a call back number (CBN) and emergency service routing digits (ESRD) from a mobile switching (MSC);
   a converter to convert said CBN and ESRD to a VoIP V2 request;
   a transmitter to send said VoIP V2 request to a VoIP positioning center (VPC); and
   a VoIP receiver to receive back said VoIP V2 request including an emergency service query key (ESQK) and an emergency service routing number (ESRN) returned by a VoIP positioning center (VPC), said VoIP V2 request having said ESQK and said ESRN inserted therein in a plurality of designated fields;
   whereby use of said ORREQ permits setup of an emergency services call over ISDN User Part (ISUP) or Multi-Frequency (MF) signaling.

9. Apparatus to translate emergency services protocol call setup information from ANSI-41 ORREQ to VoIP V2 according to claim 8, wherein said plurality of designated fields comprise:
   a DialedDigits field;
   a Mobile Directory Number (MDN) field;
   a BillingDigits field; and
   a GenericDigits field.

10. Apparatus to translate emergency services protocol call setup information from GSM MAP SLR to VoIP V2, comprising:
    a receiver to receive a GSM MAP SLR containing a call back number (CBN) and emergency service routing digits (ESRD) from a mobile switching (MSC);
    a converter to convert said CBN and ESRD to a VoIP V2 request;
    a transmitter to send said VoIP V2 request to a VoIP positioning center (VPC);
    a VoIP receiver to receive back said VoIP V2 request including an emergency service query key (ESQK) and an emergency service routing number (ESRN) returned by a VoIP positioning center (VPC) inserted therein; and
    converting said received back VoIP V2 request to an SLR with an na-ESRK with said ESQK and a last 7-digits of said ESRN;
    whereby use of said SLR permits setup of an emergency services call over ISDN User Part (ISUP) or Multi-Frequency (MF) signaling.

11. The apparatus to translate emergency services protocol call setup information from GSM MAP SLR to VoIP V2 according to claim 10, comprising:
    wherein a numbering plan area (NPA) of said ESRN has a same value as that of a numbering plan area (NPA) of said ESQK.

12. A method to translate emergency services protocol call setup information from VoIP V2 to ANSI-41 ORREQ, comprising:
    receiving VoIP V2 signaling from a Voice Service Provider (VSP);
    inserting a call back number (CBN) into both a mobile directory number (MDN) field and an emergency service routing digits (ESRD) field of an ANSI-41 ORREQ; and
    inserting an emergency service routing key (ESRK) and, if needed, digits to determine a selective router and/or trunk, into up to 20 digits of a VoIP V2 message;
    whereby use of said digits received in said VoIP V2 message permit setup of an emergency services call over Session Initiation Protocol (SIP) using a wireless ESRK.

13. The method to translate emergency services protocol call setup information from VoIP V2 to ANSI-41 ORREQ according to claim 12, further comprising:
    permitting said ESRD to determine an ESRK based on a subscribers provisioned address.

14. The method to translate emergency services protocol call setup information from VoIP V2 to ANSI-41 ORREQ according to claim 12, further comprising:
    permitting said ESRD to determine digits to select a proper selective router or a proper trunk group based on said subscribers provisioned address.

15. A method to translate emergency services protocol call setup information from VoIP V2 to GSM MAP SLR, comprising:
    receiving VoIP V2 signaling from a Voice Service Provider (VSP);
    inserting a call back number (CBN) into both an International Mobile Subscriber Identity (IMSI) field and an na-ESRD field of a GSM MAP SLR; and
    inserting an emergency service routing key (ESRK) and, if needed, digits to determine a selective router and/or trunk, into up to 20 digits of a VoIP V2 message;
    whereby use of said digits received in said VoIP V2 message permit setup of an emergency services call over Session Initiation Protocol (SIP) using a wireless ESRK.

16. The method to translate emergency services protocol call setup information from VoIP V2 to GSM MAP SLR according to claim 15, further comprising:

permitting said ESRD to determine an ESRK based on a subscribers provisioned address.

17. The method to translate emergency services protocol call setup information from VoIP V2 to GSM MAP SLR according to claim 15, further comprising:
permitting said ESRD to determine digits to select a proper selective router or a proper trunk group based on said subscribers provisioned address.

18. The method to translate emergency services protocol call setup information from VoIP V2 to GSM MAP SLR according to claim 15, wherein:
setting an na-ESRK flag.

19. A method to translate emergency services protocol call setup information from ANSI-41 ORREQ to VoIP V2, comprising:
receiving an ANSI-41 ORREQ containing a call back number (CBN) and emergency service routing digits (ESRD) from a mobile switching center (MSC);
converting said CBN and ESRD to a VoIP V2 request;
sending said VoIP V2 request to a VoIP positioning center (VPC); and
receiving back said VoIP V2 request including an emergency service query key (ESQK) and an emergency service routing number (ESRN) returned by a VoIP positioning center (VPC), said VoIP V2 request having said ESQK and said ESRN inserted therein in a plurality of designated fields;
whereby use of said ORREQ permits setup of an emergency services call over ISDN User Part (ISUP) or Multi-Frequency (MF) signaling.

20. The method to translate emergency services protocol call setup information from ANSI-41 ORREQ to VoIP V2 according to claim 19, wherein said plurality of designated fields comprise:
a DialedDigits field;
a Mobile Directory Number (MDN) field;
a BillingDigits field; and
a GenericDigits field.

21. A method to translate emergency services protocol call setup information from GSM MAP SLR to VoIP V2, comprising:
receiving a GSM MAP SLR containing a call back number (CBN) and emergency service routing digits (ESRD) from a mobile switching center (MSC);
converting said CBN and ESRD to a VoIP V2 request;
sending said VoIP V2 request to a VoIP positioning center (VPC);
receiving back said VoIP V2 request including an emergency service query key (ESQK) and an emergency service routing number (ESRN) returned by a VoIP positioning center (VPC) inserted therein; and
converting said received back VoIP V2 request to an SLR with an na-ESRK with said ESQK and a last 7-digits of said ESRN;
whereby use of said SLR permits setup of an emergency services call over ISDN User Part (ISUP) or Multi-Frequency (MF) signaling.

* * * * *